Patented June 6, 1939

2,161,114

UNITED STATES PATENT OFFICE 2,161,114

SOLUBLE DOUBLE SALTS OF THEOPHYLLINE AND MONOAMINO POLYHYDRIC ALCOHOLS

Ernest H. Volwiler, Highland Park, and Edmond E. Moore, Waukegan, Ill., assignors to Abbott Laboratories, North Chicago, Ill., a corporation of Illinois No Drawing. Application October 17, 1935, Serial No. 45,432

4 Claims. (Cl. 260—211)

An object of our invention is to produce soluble double salts of theophylline and monoamino polyhydric alcohols which combine the valuable therapeutic properties of both components, said salts being either in solid form or in solution. Said salts have the general formula:

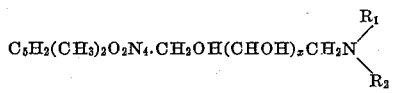

where $x$ is one or more, and where $R_1$ and $R_2$ are each hydrogen, an alkyl or a hydroxy alkyl group, $R_1$ and $R_2$ being alike or different.

Theophylline has a diuretic action, produces myocardial stimulation, and relieves the pain of coronary disease. Theophylline, however, is but slightly soluble in water, so that it has been generally found desirable to adminster it in the form of water-soluble double salts.

We have discovered that the double salts of monoamino polyhydric alcohols and theophylline are very soluble in water. We have also discovered that the monoamino polyhydric alcohols are powerful diuretics and are but slightly toxic.

The salts which we have prepared of said alcohols in combination with theophylline show all of the valuable properties of these components, with the added advantage of high water solubility.

General method

The soluble double salts can be prepared by dissolving equimolecular quantities of theophylline and the monoamino polyhydric alcohols in a suitable solvent such as freshly boiled water, filtering and then removing the solvent under vacuum in the absence of carbon dioxide until the salt separates. The salt is then filtered from the mother liquor and dried in vacuum.

The above order of addition can be varied. As an example, the monoamino polyhydric alcohols can first be dissolved in water and then the theophylline added.

Intimate mixtures of the solid theophylline and a monoamino polyhydric alcohol can be dispensed in place of the salts. Such mixtures react very quickly in water to form the soluble double salts.

We have observed that a complete solution results when an excess of the monoamino polyhydric alcohol is used, also, when a slight excess of theophylline is taken.

The dry double salts are stable in air. Solutions of the double salts can be sterilized by boiling, without decomposition.

Example 184 grams of theophylline and 182 grams of 1-methylamino-hexane 2:3:4:5:6 pent-ol (methyl glucamine) are suspended in sufficient freshly boiled water so that the total volume is 1000 cc. Upon stirring, the theophylline goes into solution as its methyl glucamine salt is formed. The solution is then filtered. If the solid salt is desired, this solution is evaporated in vacuum.

The following preparations may be made similarly:

Theophylline 1-methylamino propane 2:3 diol; theophylline 1-aminohexane 2:3:4:5:6 pent-ol (glucamine); theophylline 1-ethylaminohexane 2:3:4:5:6 pent-ol (ethyl glucamine); theophylline 1-dimethylaminohexane 2:3:4:5:6 pent-ol (dimethyl glucamine); theophylline 1-ethanolaminohexane 2:3:4:5:6 pent-ol (ethanol glucamine).

We claim as our invention:

1. A soluble double salt of theophylline and monoamino polyhydric alcohol having the general formula

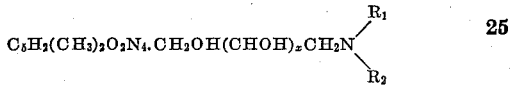

where $x$ is at least one and where $R_1$ and $R_2$ are selected from the group consisting of hydrogen, alkyl and hydroxy alkyl groups, said salt having diuretic properties.

2. The ethyl glucamine salt of theophylline, having the formula:

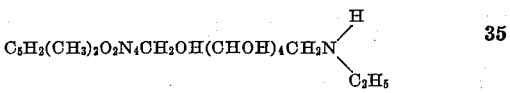

said salt having diuretic properties.

3. The ethanol glucamine salt of theophylline having the formula:

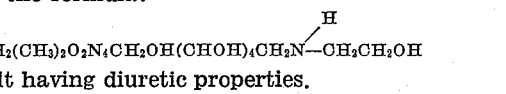

said salt having diuretic properties.

4. The methyl glucamine salt of theophylline, having the formula:

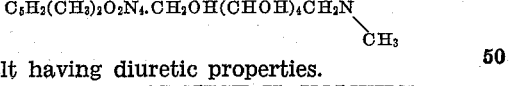

said salt having diuretic properties.

ERNEST H. VOLWILER.
EDMOND E. MOORE.